Aug. 7, 1945.  R. M. ROGERS ET AL  2,381,185
CONVEYER MECHANISM
Filed Oct. 9, 1943   3 Sheets-Sheet 1
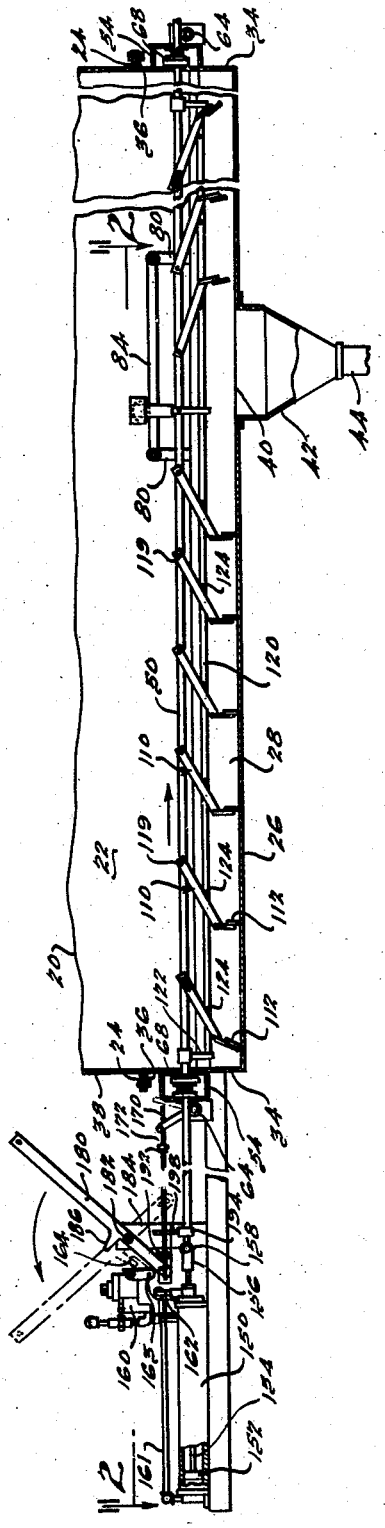
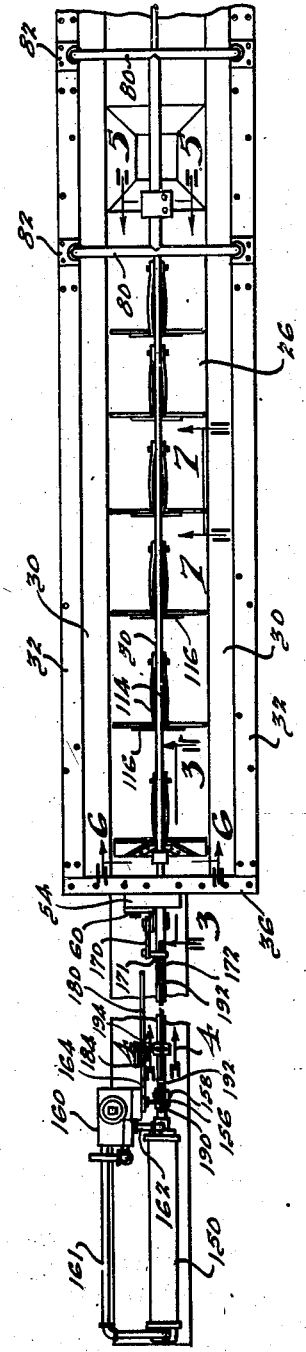
INVENTORS.
Roger M. Rogers,
BY Alexander Marriott Walker.
Harness, Dickey & Pierce.
ATTORNEYS.

INVENTORS.
Roger M. Rogers,
Alexander Marriott Walker.
BY Harness, Dickey & Pierce.
ATTORNEYS.

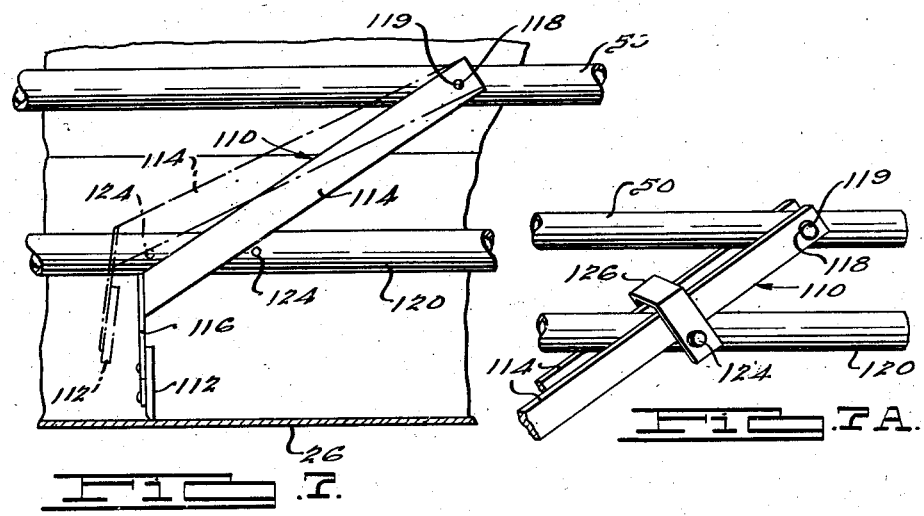
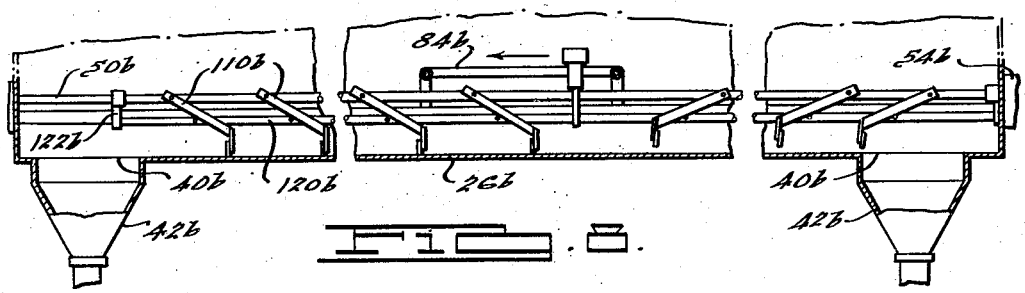
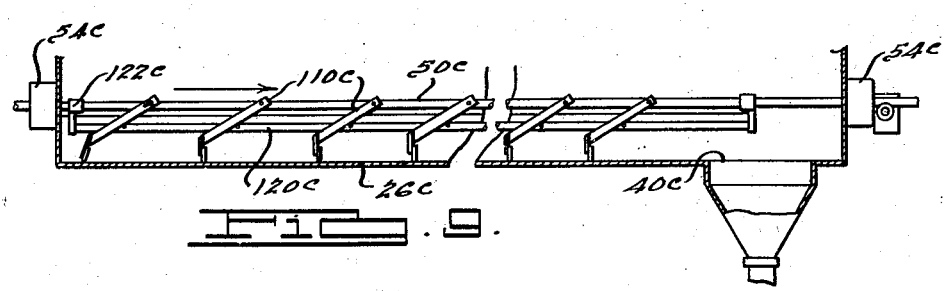
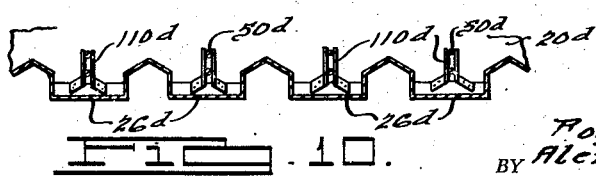

Patented Aug. 7, 1945

2,381,185

UNITED STATES PATENT OFFICE 2,381,185

CONVEYER MECHANISM

Roger M. Rogers, Birmingham, and Alexander Marriott Walker, Dearborn, Mich., assignors to C. E. Rogers Company, Detroit, Mich., a copartnership composed of Charles A. Rogers, Elmer Donald Rogers, and Roger M. Rogers Application October 9, 1943, Serial No. 505,678

9 Claims. (Cl. 198—224)

This invention relates to conveyer mechanism and particularly to the paddle plate or scraper type thereof, the principal object being the provision of mechanism of this type that is simple in construction, efficient in operation, and economical to manufacture.

Objects of the invention include the provision of conveyer mechanism of the type described capable of handling bulk materials in which the scrapers or paddles are actuated between raised and lowered positions in a new and novel manner; the provision of conveyer mechanism of the type described in which the paddles or scrapers are reciprocated in a trough and are raised during reciprocation in one direction and lowered during reciprocation in the other direction; the provision of conveyer mechanism of the type described in which one or more of the paddles or scrapers may be actuated in reverse to others thereof, in other words some of the paddles or scrapers may be caused to feed the material in a direction opposite to that which other paddles or scrapers serve to feed the material, thereby permitting the point or points of discharge from the conveyer to be located at any desired point in the length of the associated trough; the provision of a conveying mechanism of the type described in which a single power reciprocated rod serves as the sole means for supporting and reciprocating the paddles or scrapers; the provision of a conveyer mechanism as last described including means frictionally associated with the rod and movable relative thereto under the reciprocating force of the rod to effect raising and lowering movement of the paddles or scrapers; and the provision of conveying mechanism of the type described in which the paddle raising and lowering means comprises a second rod carried by the first-mentioned rod for movement relative thereto and engageable with the paddle or scraper members at a point spaced from the point of connection of the latter with the first-mentioned rods.

Further objects of the invention include the provision of conveying mechanism of the type described in which the endmost paddles or scrapers are so constructed and arranged as to prevent them from stalling the conveying mechanism by packing material against an end wall of the associated trough; the provision of conveying mechanism of the type described including novel means for supporting the reciprocable paddle supporting and actuating rod; the provision of a conveyer mechanism of the type described having a novel arrangement of paddle blade or scraper spacing; the provision of a conveyer mechanism of the type described including a drag rod and a novel form of means for sealing the passage for the rod through the end walls of the associated trough; the provision of conveyer mechanism of the type described including a novel form of connection between the paddle or scraper members and the reciprocating rod; and the provision of conveying mechanism of the type described including fluid pressure actuated means for effecting reciprocation of the actuating and supporting rod and a novel form of means for moving the valve controlling the admission and exhaust of fluid pressure to opposite ends of the fluid pressure actuated means.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a partially broken, side elevational view of conveying apparatus constructed in accordance with the present invention showing the same positioned in operative relation with respect to a trough in the lower portion of a drying chamber or the like, the latter being shown in fragmentary form and in vertical section;

Fig. 2 is a fragmentary plan view of the conveying mechanism illustrated in Fig. 1, taken as on the line 2—2 of Fig. 1;

Fig. 7 is an enlarged, fragmentary transverse sectional view taken on the line 7—7 of Fig. 2 and illustrating in greater detail the construction of the paddle or scraper members and the manner in which they are associated with cooperating parts;

Fig. 7A is a fragmentary perspective view illustrating a simple means applied to the structure shown in Fig. 7 by the use of which the paddle or scraper members may be positively moved downwardly as well as upwardly;

Fig. 8 is a view of the same general character as Fig. 1 but illustrating one manner in which the arrangement of the scraper or paddle members may be modified where conditions permit or require;

Figure 3:
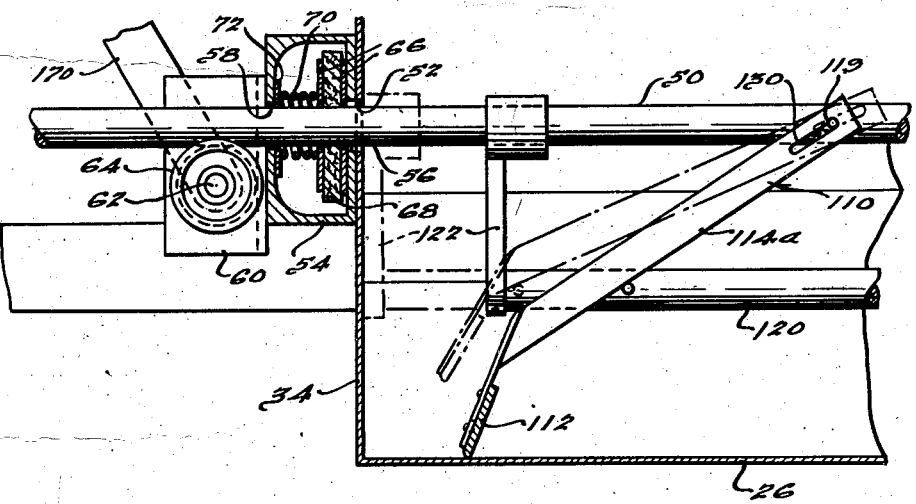
Fig. 3 is an enlarged, fragmentary, partially broken, partially sectional view taken on the line 3—3 of Fig. 2 and illustrating the preferred construction for the endmost paddles or scrapers and the manner of connecting them to their drive or drag rod, and also showing the construction of the drag rod seal at the corresponding end of the trough.

Fig. 9 is a view similar to Fig. 8 but illustrating a still further modified arrangement of scraper or paddle members and discharge points; and, Fig. 10 is a more or less diagrammatic, transverse, vertical sectional view illustrating the manner in which a plurality of conveying units constructed in accordance with the present invention may be mounted for servicing a single drying chamber or the like.

Conveyers of the type to which the present invention relate are adapted to move bulk material deposited in a trough longitudinally thereof to one or more points of discharge therefrom. They include a plurality of paddle blade or scraper members bodily reciprocable longitudinally of the trough and are operated so that during reciprocation in one direction they lie in engagement or substantial engagement with the bottom of the trough and when reciprocated in the opposite direction are raised from the bottom of the trough. Accordingly, they are adapted only to those constructions in which the flow of the bulk material into the trough is more or less gradual and of insufficient volume to completely submerge the paddles when in raised position, as in the latter case the mechanism would not function to advantage.

In the broader aspects of the invention the type of material capable of being handled by the apparatus of the present invention is more or less immaterial and such material may be either in the wet or dry state. It is, however, particularly advantageous in handling dry bulk material.

It will be appreciated by those skilled in the art that the shape, conformation and relative proportions of parts may vary in accordance with the type and character of the material to be handled thereby, the apparatus shown by way of illustration in the accompanying drawings being particularly designed to handle fine dry bulk material such as powdered milk or the like. In such case it will be appreciated that the conveying mechanism of the present invention will be positioned in the bottom of a drying bin, chamber, or the like into which the particles of material are injected in finely divided form and in which they are dried in falling to the bottom of the same and are there collected in the trough in which the conveyer mechanism is located and conveyed thereby to a suitable point or points of discharge.

The primary feature of novelty of the present invention is the provision of a conveying mechanism of the type described that is of extremely simple construction and, therefore, involves a minimum number of parts to wear or to get out of order. At the same time it may be of extremely rugged construction and may be so constructed as to adapt it to various arrangements of discharge openings. Furthermore, it is of such character that it may be readily mounted upon the floor of existing structures without the necessity of reconstructing such floor to any greater extent than providing openings therein for the discharge of material by gravity therefrom to a lower level. Where the amount of material to be handled is of greater volume than the capacity of a single conveyer of a predetermined size, one or more additional conveyers may be arranged in side-by-side relationship thereto to obtain the desired total capacity.

Figure 6:
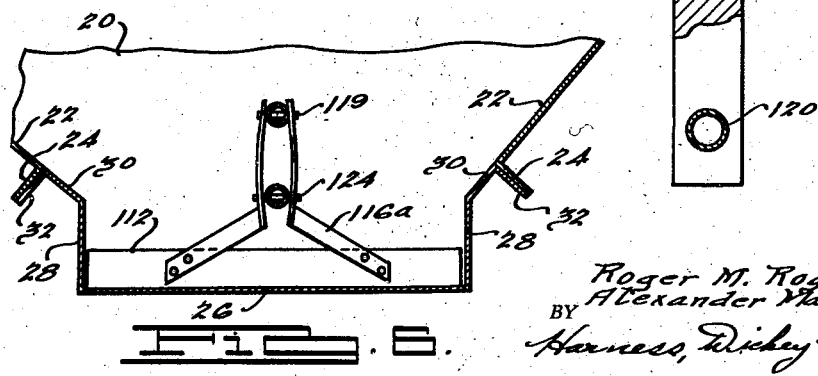
Fig. 6 is an enlarged, transverse vertical sectional view taken on the line 6—6 of Fig. 2 and showing an end view of the associated end paddle or scraper.

Referring now to the accompanying drawings and particularly to Figs. 1 and 2, a drying chamber, bin, or the like the lower portion only of which is shown, will be seen to have inwardly converging bottom wall portions 22 which, as best indicated in Fig. 6, terminate in laterally spaced relation with respect to each other and where formed of metal preferably in outwardly directed flanges 24. Between these bottom edges of the side walls 22 is received a flat bottomed trough indicated generally at 26 having perpendicularly directed side walls 28 joined at their upper ends to outwardly and upwardly directed portions 30, preferably arranged at the same angle as the bottom wall portions 22 and terminating in flanges 32 arranged in abutting relationship with respect to the corresponding flanges 24 and suitably and removably secured thereto in any conventional manner. As best illustrated in Fig. 1 the trough 26 is provided with vertically directed end walls 34 which project above the level of the flanges 24 and terminate at their upper edges in outwardly directed flanges 36 arranged in contacting relationship with respect to complementary flanges formed at the bottom edges of the end walls 38 of the drying chamber 20. The trough 26 is thereby suitably supported by the drying chamber 20 and removably secured in sealed relation with respect thereto.

In the particular embodiment of the invention illustrated in Figs. 1 to 7, inclusive, it is assumed that the trough 26 has a single and centrally located outlet opening 40 therein, the paddle blade or scraper members being arranged accordingly, and a funnel-like member 42 being secured and sealed to the bottom wall of the trough 26 about the opening 40 and discharging by gravity into a suitable conduit 44 leading to a suitable point of discharge.

In accordance with the present invention an elongated rod 50, herein termed a drag rod, extends longitudinally and centrally of the trough 26 in upwardly spaced and parallel relation with respect to the bottom thereof and projects outwardly through the end walls 34 through openings 52 therein and which, as best brought out in Fig. 3, are materially larger in diameter than the diameter of the drag rod 50 so that the drag rod 50 will be maintained in spaced relationship with respect to the margins of the openings 52 at all times.

Figure 4:
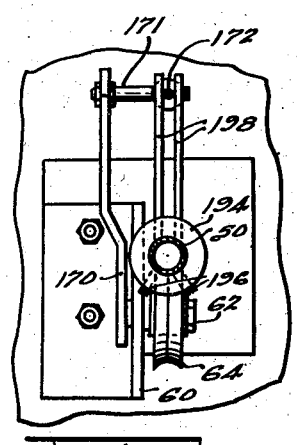
Fig. 4 is an enlarged transverse, vertical sectional view taken on the line 4—4 of Fig. 2 and particularly illustrating details of the valve actuating mechanism.

In order to support the drag rod 50 for reciprocatory movement relative to the trough 26, the mechanism best illustrated in Fig. 3 is employed, this mechanism being the same as that employed at the opposite drag rod 50 except for certain additional features employed at the lefthand end as viewed in the drawings for an additional purpose and which will later be described. Referring now to Fig. 3 it will be noted that a housing 54 is suitably fixed to the outer face of the corresponding end wall 34 and its opposite walls are provided with openings 56 and 58, respectively, aligned with the opening 52 in the corresponding end wall 34 and of substantially the same diameter as the opening 52 so that the drag rod 50 may freely pass therethrough without touching the margins thereof. Fixed to the outer wall of each housing 54 is an angle plate 60, offset from the axis of the rod 50, and supporting a transversely extending headed pin 62 upon which a roller 64 is rotatably mounted. As best illustrated in Fig. 4 the periphery of each roller 64 is grooved and of a cross-sectional configuration complementary to the cross-sectional configuration of the drag rod 50 and receives the drag rod 50 thereon. The rollers 64 thus provide an antifriction support for the drag rod 50 in its reciprocatory movements at each end of the trough 26. At the same time the rollers form a type of support for the drag rod 50 which will not bind, as would a cylindrical sleeve type of bearing, regardless of sagging or bending of the drag rod 50 over its length.

This last described feature is of extreme importance in a device of the type described for the reason that the drag rod 50 may be of considerable length and may sag not only under its own weight, under the weight of the paddle or scraper members supported thereby, and the weight of the actuating mechanism therefor, but may otherwise bend out of its straight conformation under the force of a moving operation applied therethrough to material in the trough 26. This is the reason that the openings 52, 56 and 58 are made larger than the drag rod 50 and so as to provide ample clearance between their margins and the drag rod regardless of normal sagging or bending movements of the drag rod so that no binding of the drag rod in the openings will occur.

Figure 5:
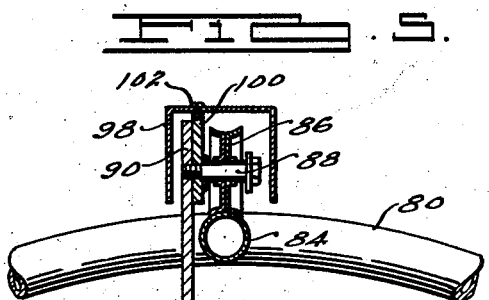
Fig. 5 is a fragmentary, partially broken, vertical sectional view taken on the line 5—5 of Fig. 2 and illustrating details of the central trolley support for the reciprocating power or drag rod.

It is desirable to seal the space between the margins of the opening 52 and the drag rod 50 against the escape of material from the trough 26, and in order to accomplish this a floating seal of the type best brought out in Fig. 3 is arranged around the drag rod 50 within each housing 54. This seal comprises a pair of metallic washers 66 relatively loosely and concentrically mounted on the drag rod 50 and an intervening relatively thick yieldable or flexible washer 68 arranged in preferably contracting relationship about the drag rod 50. The washer 68 may be formed of felt, fabric or other suitable yieldable or flexible material. A coil compression spring 70 surrounds the drag rod 50 within each housing 54 and is maintained under compression between the outer washer 66 and a third washer 72 surrounding the rod 50 and seated against the outer wall of the housing 54. The coil spring 70 thus maintains the seal assembly comprising the washers 66 and 68 against the inner wall of the corresponding housing 54 and at the same time permits the washers 66 and 68 to float in any direction with the rod 50 in the opening 52 without restricting such movement in any manner whatever. The construction thus provides a seal for the rod 50 at all times without causing any binding thereof or unduly restricting its reciprocatory movement.

Where the drag rod 50 is of relatively great length, then it may be desirable to provide an auxiliary support for it at one or more points between the rollers 64 at opposite ends of the trough 26. In the drawings one such auxiliary support is illustrated as located midway between the opposite ends of the trough 26 and, as illustrated in Figs. 1, 2, and 5, this auxiliary support takes the form of a pair of upwardly bowed tubes 80 the opposite ends of which are suitably fixed with respect to the trough 26 as, for instance, by means of brackets 82 shown secured to the corresponding side flanges 32 in Fig. 2 by way of illustration. The tubes 80 are spaced from each other longitudinally of the trough 26 and extend upwardly and over the top of the drag rod 50 and are there connected together by means of a tube 84 positioned directly over the drag rod 50 and in parallelism with the axis thereof when in normally straight condition.

A trolley is supported by the tube 84 in supporting relation with respect to the drag rod 50 and, as best brought out in Fig. 5, this trolley comprises a roller 86, which may be identical to the rollers 64 heretofore described, and arranged in rolling relation with respect to the upper surface of the tube 84. The roller 86 is rotatably mounted upon a pin 88 arranged with its axis horizontal and which threads into a vertically extending strap or bar 90. The bar 90 extends donwardly and is suitably fixed to a block 92 provided with a bore 94 therein in which the drag rod 50 is received and to which it is preferably fixed by means of a set screw such as 96.

In order to guard the roller 86 against contact with the material being discharged into the drying chamber or the like 20 and to prevent such material from being contaminated by any lubricant that may be provided between the pin 88 and the roller 86, as illustrated in Fig. 5 a sheet metal cover 98 is supported in encompassing relation with respect to the upper portion of the roller 86. The cover 98 may be of an open sided box type of construction with the open side downwardly and in the particular embodiment shown is secured to the upper end of an arm 100 also threaded on the pin 88. A screw or the like 102 may be employed for removably securing the cover 98 to the arm 100.

The drag rod 50 supports and actuates a plurality of paddle blade or scraper members indicated generally at 110. Except for the endmost of such paddle blades or scraper members arranged to feed material away from an end wall of the trough 26, they may be and are all shown as being identical to each other and are supported and actuated in the same manner. Each paddle blade or scraper member 110 comprises a paddle blade or scraper blade 112 of plate-like form disposed transversely with respect to the length of the trough 26 and of a length just sufficiently smaller than the width of the trough 26 as to be freely slidable longitudinally thereof. Except in cases where the endmost member 110 is formed in the special manner hereinafter described and constituting a further phase of the present invention, all of the paddle or scraper blades 112 are preferably positioned with the plane of their thickness approximately vertical when in operative position in the bottom of the trough 26 and their bottom edge is shaped for complementary reception by the bottom wall of the trough 26. Each paddle or scraper member 110 also includes a pair of upwardly inclined resilient arms 114 normally spaced from one another transversely of the trough 26 and provided with laterally downwardly flanged end portions 116 which are secured to the rear face of the associated paddle blade or scraper 112. The free ends of the arms 114 of each paddle blade or scraper member embrace opposite sides of the drag rod 50 when assembled thereto. As perhaps best brought out in Fig. 7 the free end of each arm 114 is provided with an opening 118 therein, the openings 118 on each pair of arms being transversely aligned with each other, The drag rod 50 at suitable intervals thereon at which it is desired to secure a paddle blade or scraper member 110 thereto is provided with a diametrically arranged pin 119 secured thereto and which projects outwardly from opposite sides thereof and which projecting ends are slidably received within the openings 118 of the arms 114 of the corresponding paddle blade or scraper member 110. Thus each paddle blade or scraper member 110 is pivotally secured at its upper end to the drag rod 50 for pivotal movement about a horizontal axis arranged perpendicularly with respect to the axis of the drag rod 50. In view of the fact that the arms 114 are resilient it will be appreciated that the upper free ends thereof may be forced apart and then allowed to approach each other over the ends of the corresponding pin 119 in order to mount each paddle blade or scraper member 110 on the rod 50, and that they may be removed in the same general manner. For this reason it is preferable that the free ends of the arms, when free of the rod 50, are spaced apart by a distance less than the diameter of the rod 50 so that when applied thereto they will resiliently embrace opposite sides of the drag rod 50 and maintain themselves securely in position thereon. It will be appreciated from the above that the paddle blade or scraper members 110 may be applied to the drag rod 50 so that the arms 114 are inclined axially of the drag rod in either direction from their points of pivot on the drag rod.

In applying the paddle blade or scraper members 110 to the drag rod 50 they will preferably extend away from the discharge opening in relation to their pivot pins 119 and so that the force of moving the material in the trough 26 will always be taken care of by a tension in the arms 114 rather than by compression. Thus in the arrangement illustrated in Figs. 1 and 2 in which the discharge opening 40 in the trough 26 is assumed to be midway between the ends of the trough 26, the paddle blades or scraper members 110 to the left of the opening 40 as viewed in Figs. 1 and 2 extend to the left of their corresponding pivot pins 119 on the rod 50, while those on the right extend to the right of their corresponding pivot pins 120.

While the paddle blade or scraper members 110 may be equally spaced from each other longitudinally of the drag rod 50, in accordance with a further phase of the present invention the spacing between these members increases preferably in proportion to their distance from the discharge openings. Thus in the arrangement illustrated in Figs. 1 and 2 where the discharge opening 40 in the trough 26 is assumed to be midway between its ends, the paddle blade or scraper members 110 adjacent the mid-point of the trough 26 are closer together than those adjacent the end portions of the trough. The reason for this is, assuming an approximately constant rate of deposit of material over the full length of the trough 26, each paddle blade or scraper member will not only have to handle the material which is thus deposited over the length of its own path of travel in the trough 26, but also over the length of the path of travel of all the other paddle blade or scraper members on that side thereof opposite the discharge opening, the result being that the material tends to pile up as it travels toward the discharge opening. In view of the fact that the capacity of each paddle blade or member 110 is limited, by the above described arrangement a greater number of them are provided in that area where the greatest bulk of material is required to be handled and with this arrangement the number of paddle blade or scraper members in each particular unit of length of the trough 26 may be made more or less proportional to the relative bulk of material to be moved over the length of each corresponding unit.

As previously indicated, the paddle blades or scraper blades 112 preferably rest in the bottom of the trough 26 during their operative stroke towards the outlet opening 40 and are raised above the bottom of the trough during their inoperative stroke in the reverse direction so as not to carry the material to be moved in the reverse direction. This raising and lowering movement of the paddles or blades 112 is accomplished by pivoting the paddle blade or scraper members 110 about their corresponding pins 119 on the drag rod 50 and is accomplished as follows. A second rod 120, herein termed a "lift" rod, is disposed below and in parallel relation with respect to the drag rod 50 within the trough 26. It is supported at each end by a bracket 122 which is fixed to the lift rod 120 and which slidably surrounds the drag rod 50. Additionally, and where the drag rod 50 and lift rod 120 is of such length as to require auxiliary support between the opposite ends of the trough 26, then as illustrated in Fig. 5 the block 92 in which the drag rod 50 is supported between its opposite ends may be extended downwardly as indicated in Fig. 5 and employed to additionally support the lift rod 120, it being arranged in slidably surrounding relationship with respect thereto as shown. The lift rod 120 is, therefore, supported for slidable movement relative to and longitudinally of the drag rod 50.

The drag rod 50 in operation has a predetermined extent of reciprocatory movement. The length of the lift rod 120 is less than the length of the trough 60, such difference in length being sufficiently less than the length of reciprocatory movement of the drag rod 50 to effect the results hereafter described.

The lift rod 120 being disposed directly below the drag rod 50, it will be appreciated that it passes between the opposite arms 114 of each paddle blade or scraper member 110. In the broader aspects of the invention it may be so connected to the various paddle blade or scraper members 110 so as to positively move them both up and down during relative reciprocatory movements thereof with respect to the drag rod 50. This may be accomplished in any suitable manner as, for instance, in the manner disclosed in Fig. 7A which will later be described. Practice has shown, however, that in most cases, perhaps, the force of gravity acting on the paddle blade or scraper members 114 is sufficient to move them downwardly so that it is only necessary to raise them by means of the rod 120. The lift rod 120 in the embodiment shown is provided at intervals over its length with diametrically disposed pins 124 projecting therethrough and extending beyond the opposite sides thereof to such an extent as to be able to engage the arms 114. The pins 124 in the construction shown engage the lower edges of the arms 114 of the cooperating paddle blade or scraper members 110. The pins 124 are spaced from each other longitudinally of the lift rod 120 in exact accordance with the spacing of the pins 119 on the drag rod 50. Each pin 124 is so positioned in the length of the lift rod 120, as best brought out in Fig. 7, that when the lift rod 120 is at that limit of its slidable or reciprocable position on the drag rod 50 which permits the corresponding paddle or scraper blade 112 to contact the bottom of the trough 26, it is spaced longitudinally of the lift rod 120 from the arms 114 of such corresponding paddle blade or scraper member 110, or at least out of material contact therewith, and when the lift rod is at the opposite limit of its reciprocable position on the drag rod 50 such pin 24 engages the arms 114 of the corresponding paddle blade or scraper members 110 and, as illustrated in dotted lines in Fig. 7, acts to cause it to pivot upwardly about its corresponding pin 119 on the drag rod 50 and thus lift the paddle or scraper blades 112 upwardly into spaced relation with respect to the bottom walls of the trough 26.

The above described movement of the lift rod 120 to effect this alternate raising and lowering of the paddle blade or scraper members 110 is accomplished in the following manner. The length of the lift rod 120 being equal to the length of the trough 26 between the opposite end walls 34 thereof less a distance smaller than the length of reciprocatory movement of the drag rod 50, it will be appreciated that as the drag rod 50 moves in one direction it will eventually bring that bracket 122 on the lift rod 120 which is at the advanced end of such lift rod in the direction of such movement into contact with the corresponding end wall 34, but the drag rod 50 will continue to move in such direction and thus cause the lift rod 120 to slide relatively rearwardly thereof until the end of the stroke of the drag rod 50 in such direction is reached. Then upon reverse movement of the drag rod 50 it will carry the lift rod 120 with it in such reverse direction until the bracket 122 at the opposite end of the lift rod 120 strikes the opposite end wall 34 of the trough 26 which will thus result in causing the lift rod 120 to slide relatively in the opposite direction on the drag rod 50.

The amount of such relative sliding movement of the lift rod 120 on the drag rod 50 may be substantially that indicated between the pin 124 illustrated in Fig. 7 in its full line and dotted line positions and which movement is sufficient to raise the cooperating paddle blade or scraper member 110 when the lift rod 120 is moved relative to the drag rod 50 in one direction, and sufficient to allow the paddle blade or scraper member 110 to drop into engagement with the bottom of the trough 26 under the force of gravity when the lift rod 120 is moved in the opposite direction. A sufficient amount of friction exists between the brackets 122 and the drag rod 50 to prevent the weight of the various paddle blade or scraper members 110 acting on the associated pins 124 from moving the lift rod 120 relative to the drag rod 50, thus insuring relative movement of the lift rod 120 relative to the drag rod 50 only under the influence of the power means employed for reciprocating the drag rod 50.

If it is desired to not only positively lift the paddle blade or scraper members but also to cause them to be positively lowered as well, then, and although any one of a number of simple expedients may be resorted to, that shown in Fig. 7A is perhaps the simplest inasmuch as no change is involved in any of the parts thus far described. In such case, and as shown in Fig. 7A, a U-shaped metal clip 126 of a width between the sides thereof slightly greater than the distance between the outside faces of the arms 114 of each paddle blade or scraper member assembly 10 is applied, with its open side facing downwardly, over the arms 114 of such assembly as shown. The free ends of the arms of the clips are apertured to receive the outer ends of the corresponding pin 124 therein, the apertures being so positioned that the bottom of the U substantially bears on the upper edges of the arms 114 to maintain the arms 114 in contact with the pin 124. Thus the clip 126 serves to maintain the arms 114 in substantial engagement with the pins 124 at all times and, as will be appreciated, acts to cause the paddle blade or scraper member assemblies 110 to be positively raised and lowered as the lift rod 120 is reciprocated alternately in opposite directions relative to the drag rod 50.

Although the clips 126 may be applied by removing the corresponding pins 124, placing the clips in position, and then replacing the pins 124, it is preferable, in order to permit ready removal of the paddle blade or scraper member assemblies 110 for cleaning or the like, to make the clips 126 of such width that they may be applied by first threading one end thereof on one end of the corresponding pin 124, then moving such end of the clip along the pin 124 as far as possible, and then by springing the free ends of the clip 126 outwardly away from each other slips the remaining end of the clip over the remaining end of the pin 124 and socketing it thereon. A reversal of this procedure permits removal of the clips without necessity of removal of the pins 124. After the clips 126 are removed the paddle blade or scraper member assemblies may be readily removed as previously described, that it, by springing the upper ends of the arms 114 outwardly off of the pins 119.

It will be appreciated from the foregoing that in the arrangement of paddle blade or scraper members 110 and outlet opening 40 illustrated in Figs. 1 and 2, the paddle blade or scraper members 110 on one side of the outlet 40 will be raised during reciprocation of the drag rod 50 in one direction and those on the opposite side of the opening 50 will be lowered, and vice versa. Thus with this arrangement only half the power is required to move the material that would otherwise be required if the material was moved in the same direction over the full length of the trough 26 and the outlet opening therefrom disposed at one end only of the trough.

Although the identically same construction of paddle blade or scraper member 110 above described may be employed for the endmost of such members in the trough 26, there is a possibility in such case that material may become built up in such quantities at an end of the trough 26 that the corresponding paddle blade or scraper member in moving on its inoperative stroke towards the corresponding end of the trough 26 will catch some of such material on its rear face and will tend to compress it between such rear face and such corresponding end wall of the trough 26, and where a sufficient amount of resistance is exerted to such compression it may stall the conveyer. In order to obviate the possibility of such occurrence the endmost paddle blade or scraper members are preferably constructed in the manner illustrated in Fig. 3 in accordance with a further phase of the present invention. The paddle blade or scrapers for such endmost members may in such case be identical to the paddle blades or scrapers 112 first described and are illustrated by the same numerals in Fig. 3. In this case, however, they are not arranged with their plane of thickness approximately vertical but instead are inclined at a material angle upwardly from the bottom of the trough towards the associated pin 119, so that in moving on their inoperative stroke toward the corresponding end wall 34, should they engage a mass of the material while on such stroke, instead of tending to pack it against the corresponding end wall 34 it will tend to raise the material and cause it to flow over its upper edge. Additionally the arms 114a thereof which may be identical to the arms 114 first described but in the particular case shown and as best brought out in Fig. 6 are provided with lower ends 116a which extend angularly outwardly and downwardly from the lower ends thereof, are provided with slots 130, arranged longitudinally of the arms 114a, for reception of the pins 119, instead of circular openings such as the openings 118 previously described and employed in the arms 114. These slots 130 permit a limited but material amount of lost motion in the connection between the arms 114a and the drag rod 50 which permits an outward shifting of the corresponding scraper blade or paddle member away from the corresponding end wall 34 under the conditions stated. Ordinarily, however, the paddle blades or scrapers 112 of such end members will move into substantial contact with the corresponding end wall 34 of the trough 26 upon each stroke of the drag rod 50 and lift rod 120 in such direction and thus prevent the accumulation of an unmoved mass of the material to be conveyed at the end of the trough.

Although in the broader aspects of the invention any suitable means or mechanism may be provided for reciprocating the drag rod 50 to the proper extent and at desired intervals and rate of speed, a simple form of mechanism for accomplishing this result is shown in the drawing and is preferred. As best illustrated in Figs. 1 and 2 this mechanism comprises a fluid actuated cylinder and piston assembly, preferably of the hydraulic type, and includes a cylinder 150 suitably supported in concentric relation with respect to the axis of the drag rod 50 and in outwardly spaced relation with respect to one end of the trough 26. A piston 152 is slidably received within the cylinder 150 and is provided with a piston rod 154 which projects out through the end of the cylinder 150 in suitably sealed relation with respect thereto and at its projecting end is provided with a clevis 156 connected to the corresponding extended end of the drag rod 50 by means of a pin 158. A conventional type of reversing valve indicated generally at 160 is connected by tubes 161 and 162 to the opposite ends of the cylinder 150 and to a suitable point of fluid under pressure and to a point of discharge in accordance with conventional practice. The valve 160 is provided with a rotatable control shaft 163 to which is fixed a cam-like arm 164 through which the shaft 163 is rotated to reverse the flow of fluid under pressure through the valve 160 to the opposite ends of the cylinder 150.

In order to rotate the shaft 163 of the valve 160 at proper intervals to obtain the desired stroke of the drive rod 50 the following mechanism is provided. As shown in Figs. 1 and 2 but perhaps best brought out in Figs. 3 and 4 the headed pin 62 which rotatably supports the rollers 64 at the lefthand end of the trough 26 as viewed in Figs. 1 and 2 is rotatably mounted in the bracket 60 and on the side of the bracket 60 opposite the roller 64 has fixed thereto an upwardly extending arm or lever 170. A laterally projecting post 171 is rotatably mounted in the free end of the arm or lever 170 and has secured thereto one end of a relatively small rod 172 which extends over the top of the drag rod 50 toward the valve 160.

As best illustrated in Figs. 1 and 2 a relatively long arm or lever 180 is pivotally mounted at 182 on a horizontal axis extending transversely with respect to the direction of reciprocation of the drag rod 50 on a suitable bracket 184 which is located between the valve 160 and the adjacent end of the trough 26 but in relatively close relationship with respect to the valve 160. The arm or lever 180 is pivoted at a point placed above its lower end and in such position that when it approaches the extremity of its movement in a clockwise direction, which is indicated in full lines in Fig. 1, it engages the arm 164 of the valve 160 when the latter is at its limit of movement in a clockwise direction about the axis of the shaft 162 and moves the latter to its limit of position in a counterclockwise direction. At a point slightly above the pivotal axis 182 of the lever 180 the lever 180 is provided with a lateral projection 186 which, when the arm or lever 180 approaches the extremity of its pivotal movement in a counterclockwise direction, as indicated in dot and dash lines in Fig. 1, it engages the free end portion of the arm 164 and moves the latter to the extremity of its position in a clockwise direction of rotation. The mass of the arm or lever 180 above its pivot point 182 is greater than the mass thereof below the pivot point 182 so that once the arm or lever 180 is swung over its vertical or neutral position the mass of the upper portion thereof acting under the force of gravity will cause it to be swung to either one limit or the other thereof with a sufficient amount of force to operate the valve 160 through the lever 164.

In order to actuate the arm or lever 180 from either limit of its oscillatable position to a point beyond its mid or neutral position in order to actuate the valve 160 in turn, the following mechanism is provided. The rod 172 which is connected to the arm or lever 170 extends to the left as viewed in Figs. 1 and 2 over the top of the drag rod 50 and at its lefthand end, as viewed in these figures, is secured to a second post 190 projecting laterally outwardly from and rotatably mounted in the lower end of the arm or lever 180. At suitably spaced points in the length of the rod 172 a pair of stop collars 192 are suitably fixed against movement to the rod 172. In addition a block 194 is fixed, as by means of set screws 196 as shown in Fig. 4, to the drag rod 50 below the rod 172. As best brought out in Fig. 4, the block 194 is provided with a pair of upwardly projecting pins 198 which span the opposite sides of the rod 172 but in substantial sliding engagement therewith. The pins 198 are located between the stop collars 192 so as to engage them during reciprocation of the drag rod 50 and through them actuate the rod 172 and through such rod actuate the arm or lever 180.

Thus, in the relation of the parts illustrated in Fig. 1, the valve arm 164 is illustrated in the position in which fluid under pressure is introduced into the lefthand end of the cylinder 150 so as to move the drag rod 50 to the right as viewed in Fig. 1 and the arm or lever 180 is illustrated in the extremity of its oscillatable position in a clockwise direction of movement. Accordingly, under such conditions, if fluid under pressure is fed through the valve 160 to the cylinder 150 the piston 152 will cause the drag rod 50 to move to the right, as viewed in Fig. 1, and as this movement continues the pins 198 carried by the block 194 will, as the drag rod 50 approaches the extremity of its reciprocable position to the right, engage the righthand stop collar 192 and more or less slowly cause the arm or lever 180 to move in a counterclockwise direction of rotation about its axis 182. As this movement continues, the arm or lever 180 will first be brought to its vertical neutral position and then slightly beyond the same in a counterclockwise direction of movement upon which the force of gravity acting on the arm or lever 180 will cause it to flop over to its extreme limit of movement in a counterclockwise direction of rotation and will bring the projection 186 into engagement with the arm 164 of the valve 160 and will move such arm 164 to actuate the valve 160 to reverse the direction of flow of fluid under pressure to the cylinder 150, thus causing the direction of reciprocation of the drag rod 50 to be reversed. Under these last-mentioned conditions, that is, when the arm or lever 180 is in the position indicated by dot and dash lines in Fig. 1, as the drag rod 50 moves to the left under such conditions the pins 198 on the block 194 will engage the lefthand stop collar 192 as the drag rod 50 approaches the end of its stroke in such direction and will cause the arm or lever 180 to pivot in a clockwise direction of rotation about its pivot point 182 until it is moved over its neutral point, upon which the force of gravity acting upon it will rock it to its extreme position in a clockwise direction of movement and, in so doing, that part of the arm or lever 180 below the pivot point 182 will strike the arm 164 of the valve 160 and cause the valve to be returned to its original position, or limit of movement in a counterclockwise direction, upon which the flow of fluid under pressure to the cylinder 150 will again be reversed to again cause the drag rod 50 to move to the right, as viewed in Fig. 1, whereupon the above-described sequence of operations will be repeated. The spacing of the collars 192 on the rod 172 is adjustable and by this means the stroke of the drag rod 150 is controlled to provide that stroke desired.

From the above description it will be appreciated that as the drag rod 50 is thus reciprocated by the piston 152 in the cylinder 150, as the drag rod 50 moves to the right, as viewed in Figs. 1 and 2, the paddle blade or scraper members 110 to the left of the discharge opening 140 will be lowered into contact with bottom of the trough 26 while those to the right of the discharge opening 40 will be raised above the bottom of the trough 26 and will pass over the material being deposited into the trough. It will likewise be understood that as the drag rod 50 is reciprocated to the left, as viewed in Fig. 1, the paddle blade or scraper members 110 to the right of the discharge opening 40 will be lowered into contact with the bottom of the trough 26 while those to the left of the discharge opening 40 will be raised above the bottom of the trough 26, and that in either case those paddle blade or scraper members 110 which are resting upon the bottom of the trough 26 will, during their movement under such conditions, engage the material in the trough and move it in the direction of the discharge opening 40.

It will be appreciated from the foregoing that the means and mechanism providing the essential elements of the conveyer of the present invention are extremely simple, may be made of extremely rigid and sturdy construction capable of withstanding continued and relatively hard use without material danger of disrupting continued operation, and that by the use of the single power reciprocated drag rod 50 the various paddle blades or scraper members are not only caused to be oscillated in the trough 26, but to be raised and lowered in proper sequence during the reciprocation of the drag rod 50 and this through the simple expedient of the single lift rod 120 slidably mounted on and moved by the drag rod 50. It will be appreciated that because of the construction of the various paddle blade or scraper members 110 they may be easily and readily applied and removed, which feature is of great advantage not only in the assembly and repair of the apparatus but particularly in those constructions which require the apparatus to be thoroughly cleaned after each run as in such case the various paddle blade or scraper members may be removed and scrubbed or otherwise cleaned, as may be required under the circumstances, in a minimum of time and with a minimum of effort. Furthermore, because of the reversibility of the direction of inclination of the various paddle blade or scraper members 110 with respect to the drag rod 50, the construction particularly lends itself to application to conveyers of this type having a wide variety of arrangements and discharge openings from the associated trough.

As a matter of illustration, two instances of the last-mentioned feature are shown in Figs. 8 and 9 and in which figures parts corresponding to the parts described in the construction shown in Figs. 1 to 7, inclusive, are indicated by the same numerals except that in the case of Fig. 8 such numbers bear the sub-mark "b" and in Fig. 9 the sub-mark "c". In the construction illustrated in Fig. 8, instead of providing a central discharge opening such as 40 in the first described construction, and centrally of the associated trough 26, two discharge openings 40b are provided in the trough 26b, the discharge openings 40b being at opposite ends of the trough 26b. In this case it will be appreciated that it is necessary to feed the material deposited into the trough 26b from the central portion thereof outwardly toward the opposite ends thereof and, accordingly, the paddle blade or scraper members 110b are reversed in direction from that shown in the first-described construction, the resulting operation of the structure thus being made apparent.

In the construction illustrated in Fig. 9, a single discharge opening 40c is provided in the trough 26b at one end only thereof. Accordingly, in this case all of the paddle blade or scraper members 110c are inclined in the same direction. It will be appreciated that the structure in this figure is similar to and operates in substantially the same manner as the lefthand end of the structure illustrated in Figs. 1 and 2.

It has been previously mentioned that where one conveyer unit such as illustrated in Figs. 1 and 2 is not sufficient to take care of the capacity of flow of material to be conveyed in any instance in a single drying chamber or the like, then in such case two or more such units may be employed in side-by-side relationship. Such an arrangement is indicated more or less diagrammatically in Fig. 10 in which parts equivalent to those in the structures previously described are indicated by the same numerals except that in this case the numerals carry the sub-letter "d." It will be noted that in Fig. 10 four units, each including a trough 26d and an associated drag rod 50d and cooperating paddle blade or scraper members 110d are provided in the bottom of the drying chamber, bin or the like 20d, and in which case, as will be readily appreciated, where each of such units is of the same size and capacity as the unit illustrated in Figs. 1 and 2, four times the volume of material may be handled.

It will also be appreciated that the conveyer mechanism of the present invention is applicable for installation in existing buildings without substantial reconstruction thereof to accommodate it. In such case the trough 26 or its equivalent may be supported either on or above a floor and the only modification required in such case in the building is the provision of openings through the floor of sufficient size to receive the funnel member 42, discharge tube 44, or the equivalent, as required in each particular case, in order to permit the material to be discharged from the trough under the force of gravity where such type of discharge is desired.

Having thus described our invention, what is claimed by Letters Patent is:

What is claimed is:

1. Conveyer mechanism comprising, in combination, an elongated trough-like member, a rod reciprocably mounted above said member in spaced relation with respect to the bottom thereof, a plurality of scraper members pivotally secured at one end to said rod and extending downwardly therefrom at an angle to the vertical into said trough, an actuating rod slidably supported on said drag rod for movement axially with respect thereto, means for effecting sliding movement of said actuating rod relative to said drag rod, and means cooperating between said actuating rod and said scraper members operative to raise said scraper members into spaced relationship with respect to the bottom wall of said trough-like member when said actuating rod is shifted in one direction on said drag rod and to lower said scraper blade members into substantial engagement with the bottom of said trough-like member when said actuating rod is shifted in the opposite direction of movement on said drag rod.

2. Conveyer mechanism comprising, in combination, a trough-like member, a drag rod supported above said member in approximate parallelism with respect to the bottom wall thereof for reciprocatory movement with respect thereto, an operating rod arranged in spaced relation below said drag rod reciprocable with and relative to said drag rod and slidably and frictionally connected to said drag rod, means for effecting relative reciprocation between said drag rod and said actuating rod during reciprocation of said drag rod, a plurality of scraper blade members each comprising a blade portion and an arm portion, said arm portions being pivotally connected to said drag rod and extending downwardly therefrom, means on said actuating rod engageable with said arms of said scraper blade members when said actuating rod is reciprocated in one direction relative to said drag rod for effecting pivotal movement of said scraper blade members in one direction about their points of connection with said drag rod, and permitting pivotal movement of said scraper blade members in the opposite direction when said actuating rod is reciprocated in the opposite direction with respect to said drag rod, and means for effecting reciprocation of said drag rod.

3. In conveying mechanism, in combination, a reciprocable drag rod, a plurality of scraper blade members each comprising a scraper blade and an arm connected thereto, means pivotally connecting the free ends of said arms to said drag rod at points spaced longitudinally of said drag rod, and means for effecting pivotal movement of said scraper blade members with respect to their points of connection with said drag rod comprising an actuating rod frictionally but slidably supported on said drag rod and operatively engaging said arms of said scraper blade members between the opposite ends thereof, and means for effecting movement of said actuating rod first in unison with reciprocatory movement of said drag rod and then relatively axially with respect to said drag rod during each reciprocatory stroke of said drag rod.

4. Conveyer mechanism comprising, in combination, an elongated trough-like member, a rod reciprocably mounted above said member in spaced relation with respect to the bottom thereof, a plurality of scraper members pivotally secured at one end to said rod and extending downwardly therefrom at an angle to the vertical into said trough, an actuating rod slidably supported on said drag rod for movement axially with respect thereto, means for effecting sliding movement of said actuating rod relative to said drag rod, and means cooperating between said actuating rod and said scraper members operative to positively raise said scraper members into spaced relationship with respect to the bottom wall of said trough-like member when said actuating rod is shifted in one direction on said drag rod and to positively lower said scraper blade members into substantial engagement with the bottom of said trough-like member when said actuating rod is shifted in the opposite direction of movement on said drag rod.

5. Conveying mechanism comprising, in combination, a trough-like member, a drag rod supported above the bottom of said trough-like member for reciprocable movement with respect thereto, a pair of brackets frictionally slidably mounted on said drag rod, an actuating rod carried by said brackets in spaced and parallel relation with respect to said drag rod, a plurality of scraper blade members each comprising a scraper blade operatively positioned with respect to said trough-like member and an arm extending upwardly and longitudinally of said drag rod therefrom, means for securing the upper ends of said arms to said drag rod at spaced points axially thereof for pivotal movement with respect thereto, means cooperating with said actuating rod limiting movement thereof axially with said drag rod to a distance less than the distance of reciprocation of said drag rod, and means cooperating between said actuating rod and said arms operable to lift said scraper blade members with respect to the bottom of said trough-like member during reciprocation of said actuating rod in one direction with respect to said drag rod and to lower said scraper blade members upon relative reciprocation of said actuating rod with respect to said drag rod in the opposite direction comprising pins on said actuating rod engageable with said arms on said scraper blade members and clips carried by said pins maintaining said arms in substantial engagement with said pins.

6. Conveying mechanism comprising, in combination, a trough-like member, a drag rod supported above the bottom of said trough-like member for reciprocable movement with respect thereto, a pair of brackets frictionally slidably mounted on said drag rod, an actuating rod carried by said brackets in spaced and parallel relation with respect to said drag rod, a plurality of scraper blade members each comprising a scraper blade operatively positioned with respect to said trough-like member and an arm extending upwardly and longitudinally of said drag rod therefrom, means for securing the upper ends of said arms to said drag rod at spaced points axially thereof for pivotal movement with respect thereto, means cooperating with said actuating rod limiting movement thereof axially with said drag rod to a distance less than the distance of reciprocation of said drag rod, and means cooperating between said actuating rod and said arms operable to lift said scraper blade members with respect to the bottom of said trough-like member during reciprocation of said actuating rod in one direction with respect to said drag rod and to lower said scraper blade members upon relative reciprocation of said actuating rod with respect to said drag rod in the opposite direction.

7. In conveying mechanism of the type described, in combination, a trough having an end wall, a drag rod reciprocably mounted above said trough, a scraper blade member comprising a scraper blade adapted for movement between a position in substantial contact with the bottom of said trough and a position in upwardly spaced relation with respect thereto and a pair of laterally spaced arms secured thereto and projecting upwardly therefrom and inclined in the direction of axial movement of said drag rod, the free ends of said arms embracing opposite sides of said drag rod, said free ends of said arm being slotted longitudinally thereof, a pin projecting diametrically through said drag rod and beyond opposite sides thereof arranged with its opposite ends received within the slots of said arms whereby said scraper blade member is mounted for both pivotal and bodily shiftable movement with respect to said drag rod, said scraper blade member adapted to be moved into closely adjacent relationship with respect to said end wall at one limit of the reciprocable movement of said drag rod, and said scraper blade being inclined upwardly from its lower edge away from said end wall at a material angle to said end wall.

8. Conveying mechanism comprising, in combination, a trough-like member having a discharge opening therein, means for supporting and reciprocating a plurality of scraper blade members within said trough-like member, the spacing between said scraper blade members increasing longitudinally of said trough-like member from said discharge opening in a direction opposite to the direction of movement of material moved by said scraper blade members towards said discharge opening.

9. In conveying mechanism of the type described, in combination, a trough-like member having a pair of spaced discharge openings therein, a plurality of scraper blade members operatively positioned in said trough-like member and arranged for bodily reciprocatory movement in said trough-like member, means for lifting and lowering said scraper blade members alternately during alternate reciprocatory strokes thereof, said scraper blade members being arranged in two groups one of which is arranged to feed material deposited in said trough to one of said discharge openings and the other of which is arranged to feed material discharged into said trough to the other of said discharge openings, the scraper blade members of each of said groups being arranged in increased spaced relation with respect to each other away from the corresponding of said discharge openings.

ROGER M. ROGERS.
ALEXANDER MARRIOTT WALKER.